US010739619B2

(12) United States Patent
Rigas

(10) Patent No.: US 10,739,619 B2
(45) Date of Patent: Aug. 11, 2020

(54) GLARE REDUCING GLASSES

(71) Applicant: Peter Rigas, Yardley, PA (US)

(72) Inventor: Peter Rigas, Yardley, PA (US)

(73) Assignee: Kramden Enterprises, LLC, Dover, DE (US)

( * ) Notice: Subject to any disclaimer, the term of this patent is extended or adjusted under 35 U.S.C. 154(b) by 0 days.

(21) Appl. No.: 16/441,399

(22) Filed: Jun. 14, 2019

(65) Prior Publication Data

US 2019/0346696 A1   Nov. 14, 2019

Related U.S. Application Data

(63) Continuation-in-part of application No. 15/681,842, filed on Aug. 21, 2017, now Pat. No. 10,324,310, which is a continuation-in-part of application No. 14/937,902, filed on Nov. 11, 2015, now Pat. No. 9,740,029.

(51) Int. Cl.
*G02C 7/10* (2006.01)
*G02C 9/02* (2006.01)
*G02C 11/00* (2006.01)

(52) U.S. Cl.
CPC .............. *G02C 9/02* (2013.01); *G02C 11/12* (2013.01)

(58) Field of Classification Search
CPC ........ G02C 5/2209; G02C 7/06; G02C 7/086; G02C 7/102; G02C 7/104

USPC ............................ 351/45, 46, 47, 57, 48, 58
See application file for complete search history.

(56) References Cited

U.S. PATENT DOCUMENTS

| 5,182,588 | A  | * | 1/1993 | Maurer | ................. | A61C 19/00 |
| | | | | | | 351/159.65 |
| 7,195,350 | B2 | | 3/2007 | Kurzrok | | |
| 7,656,581 | B2 | | 2/2010 | Giraudet | | |
| 2016/0139430 | A1 | | 5/2016 | Rigas | | |

FOREIGN PATENT DOCUMENTS

FR         2260807        9/1975

OTHER PUBLICATIONS

PCT/US2018/047011. International Preliminary Report on Patentability. dated Feb. 25, 2020.

* cited by examiner

*Primary Examiner* — Hung X Dang
(74) *Attorney, Agent, or Firm* — Joseph E. Maenner; Maenner & Associates, LLC

(57) ABSTRACT

An eyeglass assembly includes a frame and a lens assembly attached to the frame. The lens assembly includes a body, a connecting portion extending below the body, and a glare reducing portion extending below the connecting portion. When the eyeglass assembly is worn by a wearer, the glare reducing portion is located below a vision level of the wearer.

18 Claims, 7 Drawing Sheets

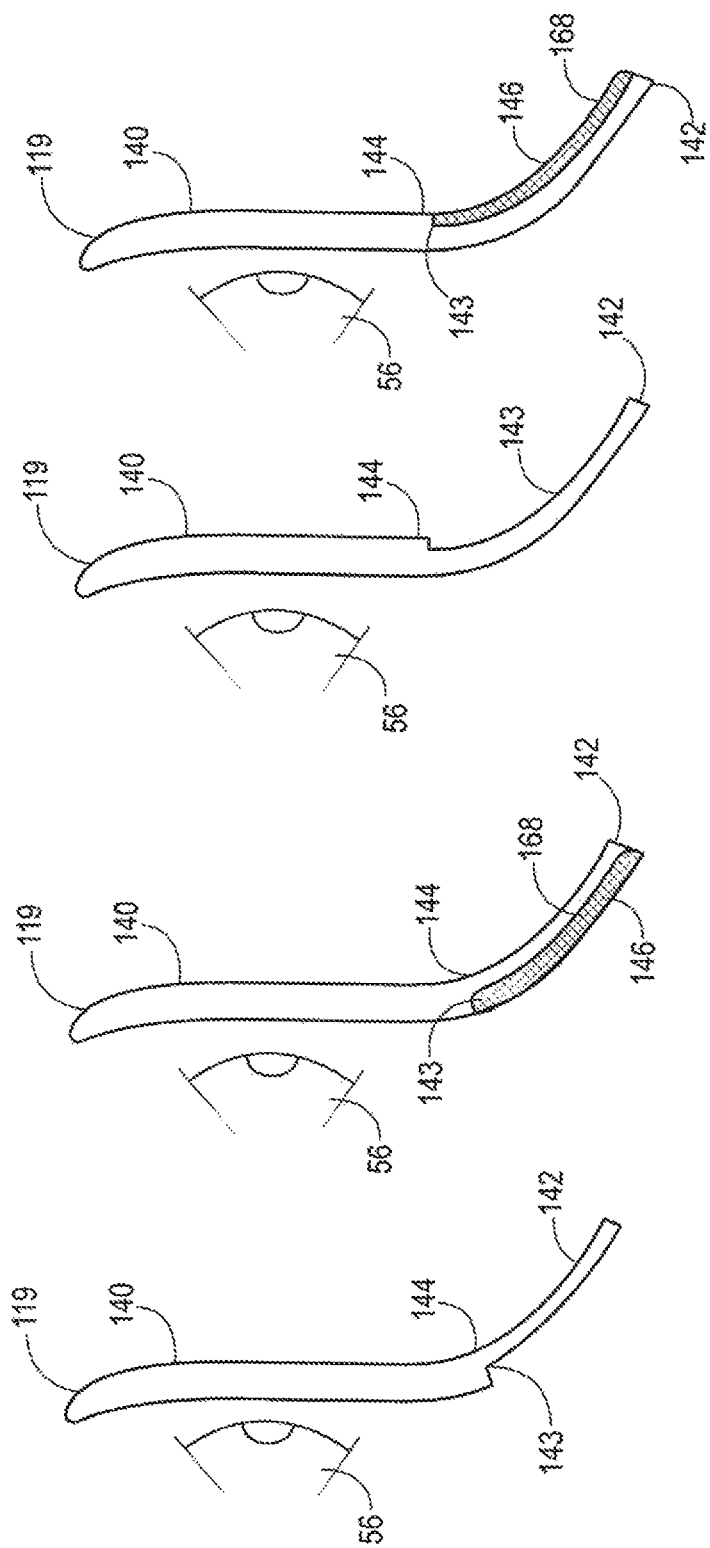

GLARE REDUCING GLASSES

CROSS-REFERENCE TO RELATED APPLICATIONS

The present application is a continuation-in-part of U.S. patent application Ser. No. 15/681,842, filed on Aug. 21, 2017 and issued on Jun. 18, 2019 as U.S. Pat. No. 10,324,310, which is a continuation-in-part of U.S. patent application Ser. No. 14/937,902, filed on Nov. 11, 2015, which issued on Aug. 22, 2017 as U.S. Pat. No. 9,740,029, both of which are incorporated herein by reference in their entireties.

BACKGROUND OF THE INVENTION

Field of the Invention

The present invention relates to sunlight reducing material applied around a user's eyes to reduce sun glare.

Description of the Related Art

Eye black is often used by athletes under their eyes to reduce sunlight and reduce sun glare. Eye black is a waxy substance, similar in texture to lipstick, that is directly applied to the skin underneath the eyes. The eye black must be washed off vigorously to fully remove it from the skin. It would be beneficial to provide a product that provides the benefit of eye black that is not applied the skin and can be easily and quickly removed by a wearer.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, the present invention provides an eyeglass assembly that includes a frame and a lens assembly attached to the frame. The lens assembly includes a body, a connecting portion extending below the body, and a glare reducing portion extending below the connecting portion. When the eyeglass assembly is worn by a wearer, the glare reducing portion is located below a vision level of the wearer.

In an alternative embodiment, the present invention provides an eyeglass assembly comprising a lens assembly, a first templar arm attached to the lens assembly, and a glare reducing portion having a glare reducing band. The glare reducing band is pivotable between a first location below the lens assembly and a second location below the first templar arm.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention. In the drawings:

FIG. 3 is a side elevational view of a lens according to an alternative exemplary embodiment of the present invention;

FIG. 4 is a side elevational view of the lens of FIG. 3, with an insert attached to a glare reducing portion;

FIG. 5 is a side elevational view of a lens according to another alternative exemplary embodiment of the present invention;

FIG. 6 is a side elevational view of the lens of FIG. 5, with an insert attached to a glare reducing portion;

DETAILED DESCRIPTION

Figure 1:
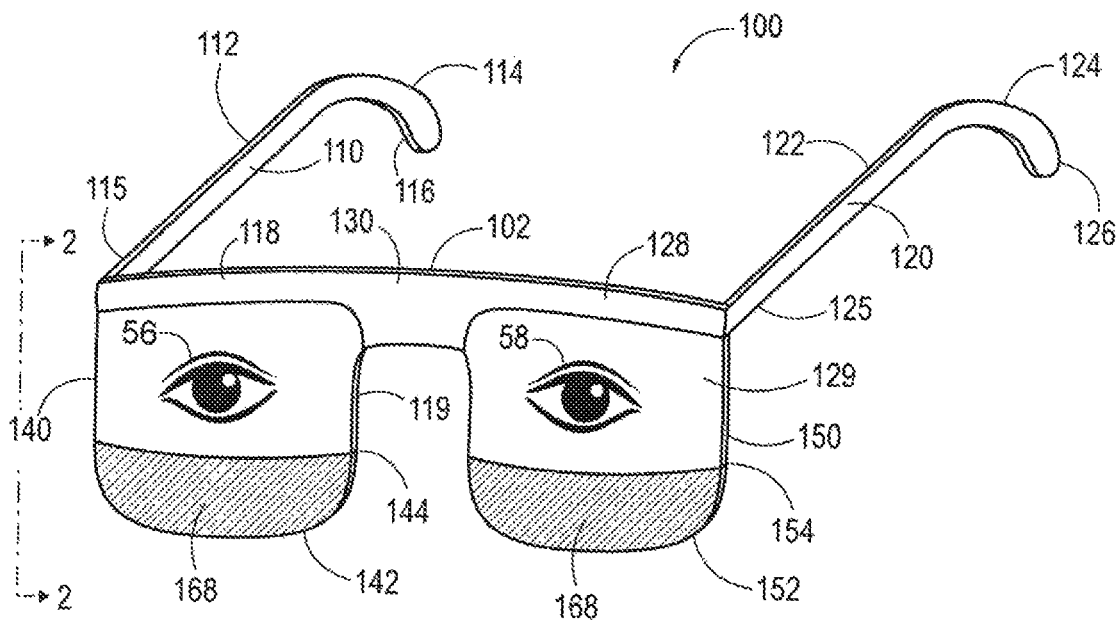
FIG. 1 is a perspective view of glare reducing glasses according to a first exemplary embodiment of the present invention.

In the drawings, like numerals indicate like elements throughout. Certain terminology is used herein for convenience only and is not to be taken as a limitation on the present invention. The terminology includes the words specifically mentioned, derivatives thereof and words of similar import. As used herein, the term "forward" means a direction away from the eyes of a wearer of the inventive glasses and "rear" means a direction closer to the eyes of the wearer of the inventive sunglasses.

The embodiments illustrated below are not intended to be exhaustive or to limit the invention to the precise form disclosed. These embodiments are chosen and described to best explain the principle of the invention and its application and practical use and to enable others skilled in the art to best utilize the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

The word "about" is used herein to include a value of +/−10 percent of the numerical value modified by the word "about" and the word "generally" is used herein to mean "without regard to particulars or exceptions."

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Unless explicitly stated otherwise, each numerical value and range should be interpreted as being approximate as if the word "about" or "approximately" preceded the value of the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Differences between different embodiments are construed to be applicable to all embodiments if not explicitly stated to the contrary.

Referring to the Figures, the present invention is used to reduce sun glare. The invention is easily applicable to a user and is also easily removable, without the effort required to remove conventional eye black is applied directly to a user's skin under the eyes.

Figure 2:
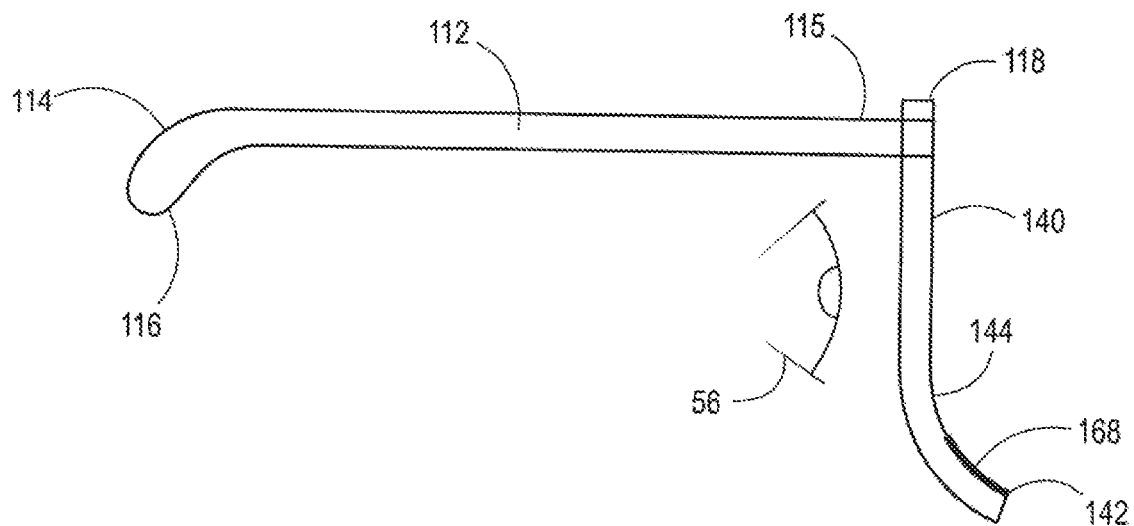
FIG. 2 is a side elevational view of the glasses of FIG. 1, taken along lines 2-2 of FIG. 1.

Referring specifically to FIGS. 1-2, a sun glare reducer 100 according to a first exemplary embodiment of the present invention is shown. Sun glare reducer 100 is similar to conventional eyeglasses, but includes a sun glare reducing portion below vision level as worn by a user.

Sun glare reducer 100 includes a frame 102 having a right templar portion 110, a left templar portion 120 and a nose bridge portion 130 extending between right templar portion 110 and left templar portion 120.

Right templar portion 110 extends from frame 102 and includes an elongate member 112 having a first end 114 and a second end 115. First end 114 ends in a curved portion 116 that is sized and shaped to fit around the user's right ear 42.

Similarly to right temple portion 110, left templar portion 120 includes an elongate member 122 having a first end 124 and a second end 125. First end 124 ends in a curved portion 126 that is sized and shaped to fit around the user's left ear 44.

Frame 102 also includes a right lens retaining portion 118 connected to right templar portion 110. Right templar portion 110 can be hingedly connected to right lens retaining portion 118 or, alternatively, right templar portion 110 can fixedly extend from right lens retaining portion 118 at an angle of about 90 degrees. Similarly, frame 102 also includes a left lens retaining portion 128 connected to left templar portion 120. Left templar portion 120 can be hingedly connected to left lens retaining portion 128 or, alternatively, left templar portion 120 can fixedly extend from left lens retaining portion 128 at an angle of about 90 degrees.

Nose bridge portion 130 connects right lens retaining portion 118 and left lens retaining portion 128. A right lens 119 is retained by right lens retaining portion 118 and a left lens 129 is retained by left lens retaining portion 128. In an exemplary embodiment, as shown in FIG. 1, each of right and left lens retaining portion 118, 128 extends just along the top outer perimeter of respective lenses 119, 129. Those skilled in the art, however, will recognize that right and left lens retaining portions 118, 128 can extend fully around the entire outer perimeter or just around the bottom outer perimeter such that nose bridge portion 130 can connect connects right lens retaining portion 118 and left lens retaining portion 128.

Right lens 119 has a right body 140 disposed between right templar portion 118 and nose bridge 130. Right lens 119 also has a right glare reducing portion 142 extending downwardly from right body 140 below right lens retaining portion 119. Right glare reducing portion 142 can be integrally connected with right body 140. Alternatively, right glare reducing portion 142 can be separate from right body 140 such that right lens retaining portion 118 separates right glare reducing portion 142 from right body 140.

Similarly, left lens 129 has a left body 150 disposed between left templar portion 128 and nose bridge 130. Left lens 129 also has a left glare reducing portion 152 extending downwardly from left body 150 below left lens retaining portion 129. Left glare reducing portion 152 can be integrally connected with left body 150. Alternatively, left glare reducing portion 152 can be separate from left body 150 such that left lens retaining portion 128 separates left glare reducing portion 152 from left body 150.

Each of bodies 140, 150 can have a generally planar outer surface (forward from the wearer's eyes 56, 58) such that lenses 119, 129 are included solely for cosmetic purposes, with no intention of correcting vision. Alternatively, each of bodies 140, 150 can have a convex outer surface to provide for at least some amount of vision correction.

Where right and left glare reducing portion 142, 152 are integrally connected with their respective bodies 140, 150, each of right lens 119 and left lens 129 further comprises a forward extending connecting portion 144, 154, respectively, connecting right bodies 140, 150 and respective right and left glare reducing portions 142, 152 as a unibody construction. The unibody construction allows body 140, connecting portion 144, and glare reducing portion 142 to be molded as a single piece.

As shown in FIG. 2, connecting portions 144, 154 can be concave to extend right and left glare reducing portions 142, 152 forward. Alternatively, connecting portions 144, 154 can be other shapes and configurations, as will be described in detail below.

Optionally, each of right and left glare reducing portions 142, 152 are removably connected to their respective bodies 140, 150. The connection can be magnetic, hook and loop, snap, or other suitable connecting means. Also, if right and left glare reducing portions 142, 152 are connected to frame 102, right and left glare reducing portions 142, 152 can be removably connected to frame 102.

Optionally, either one or both of right and left glare reducing portions 142, 152 can include indicia 168 printed thereon. Indicia 168 can include words and/or artwork. For example, indicia 168 can be the name and/or logo of a sports team. Such indicia would make sun glare reducer 100 attractive to sports fans who may want to emulate their favorite athletes while attending outdoor sporting events.

Glare reducing portions 142, 152 can each have a cutout on a rear portion of glare reducing portions 42, 12. FIG. 3 shows a cutout 143 on right glare reducing portion 142. A filler 146 is inserted into cutout 143 to form a smooth rear portion of glare reducing portion 142, as shown in FIG. 4. Indicia 168 can be applied to filler 146 so that indicia 168 is visible through glare reducing portion 142 when filler 146 is attached to glare reducing portion 142. Optionally, filler 146 an be removably inserted into cutout 143 so that filler 146 can be removed and another filler can be inserted in cutout 143. This allows a wearer to customize sun glare reducer 100 to display different desired indicia. Alternatively, filler 146 can be fixedly attached within cutout 143 so that filler 146 is not readily removable.

By way of example only, lens 119 can be manufactured with body 140, connecting portion 144, and glare reducing portion 142 with cutout 143 being a single piece, and filler 146 can be attached to the rear of glare reducing portion 142 at a later time. In effect, glare reducing portion 142 has a thinner cross section than body 140 and connecting portion 144 to accommodate the attachment of filler 146.

Alternatively, as shown in FIG. 5, cutout 143 can be on a forward part of glare reducing portion 142, and, as shown in FIG. 6, filler 146 can be inserted into cutout 143 so that filler 146 is on a forward portion of glare reducing portion 142.

Additionally, sun glare reducing portion 142 can be colored. In an exemplary embodiment, the entire sun glare reducing portion 142 can be a single color, such as, for example, black, in order to reduce a maximum amount of sunlight and reduce glare to the user's eyes 56, 58. Alternatively, sun glare reducing portion 142 can be a different color, or multiple colors, such as, for example, a sporting team's colors. Similarly to indicia 138, providing sun glare reducing portion 142 in a sporting teams colors would make sun glare reducer 100 attractive to sports fans who want to show the team colors.

Figure 7:
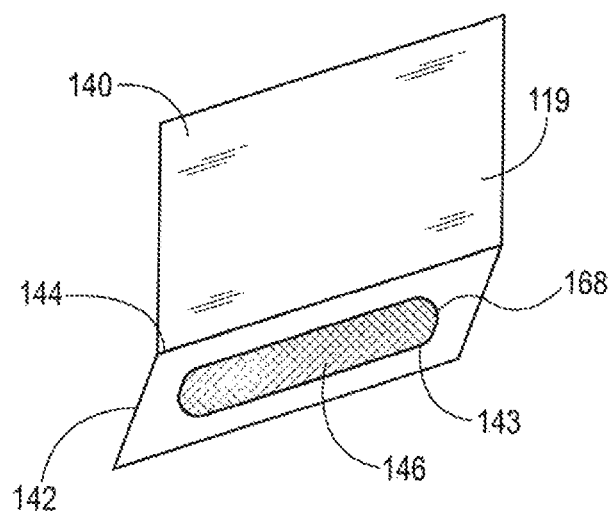
FIG. 7 is a perspective view of glare reducing glasses according to another exemplary embodiment of the present invention.

As shown in either FIG. 3 or FIG. 5, cutout 143 can extend across then entire length of glare reducing portion 142 or, alternatively, cutout 143 an extend just partially within glare reducing portion 142, with a frame of glare reducing portion 142 extending around cutout 143 such that, when filler 146 is inserted into cutout 143 as shown in FIG. 7, a border 148 of glare reducing portion 142 surrounds filler 146 and indicia 168 imprinted thereon.

Figures 8, 9:
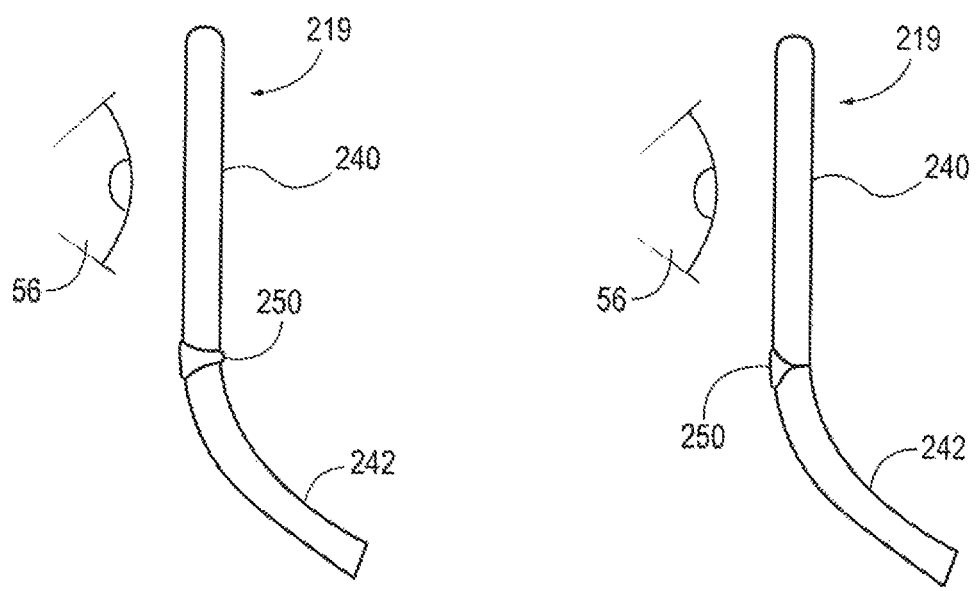
FIG. 8 is a side elevational view of a lens assembly for use with glasses according to an exemplary embodiment of the present invention.
FIG. 9 is a side elevational view of an alternate lens assembly for use with glasses according to an exemplary embodiment of the present invention.

Alternatively, as shown in FIG. 8, a lens assembly 219 can have a body 240 and a separate glare reducing portion 242 that is connected to body 240 with a cross bar 250. Cross bar 250 can be visible from the forward portion of lens 219 or, as shown in FIG. 8, glare reducing portion 242 can butt up against body 240 such that cross bar 250 can be hidden from view (not visible) when looking at lens 219 from the forward side of lens 219, as shown in FIG. 9.

Figure 10:
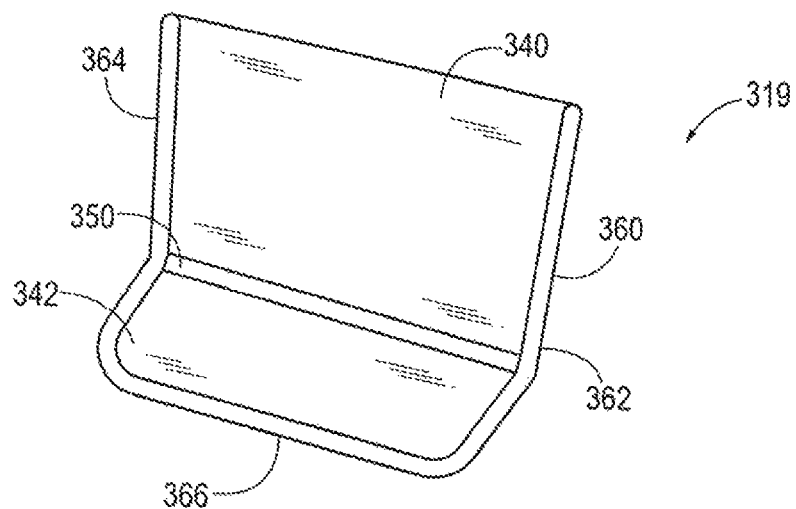
FIG. 10 is a perspective view of glare reducing glasses according to another exemplary embodiment of the present invention.

Still alternatively, a lens assembly 319 can include a body 340 and a separate glare reducing portion 342 with a gap 350 between the bottom of body 340 and the top of glare reducing portion 342, as shown in FIG. 10. A frame 360 has sides 362, 364 at least along the side edges of body 340, across gap 350, and along the side edges of glare reducing portion 343. Optionally, frame 360 can further include a forward portion 366 that extends across the most forward portion of glare reducing portion 342 and connects with sides 362, 364.

Optionally, glare reducing portion 342 can be removably attached to frame 360, such as by a snap in fit, by hook and loop fasteners, or other known connection method that can securely retain glare reducing portion 342 within frame 360, yet allow glare reducing portion 342 to be removed from frame 360 and replaced with a different glare reducer.

Figure 11:
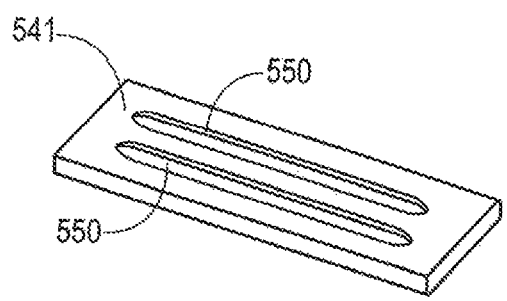
FIG. 11 is a perspective view of an alternative embodiment of a glare reducing portion for use with glasses according to the present invention.
Figure 12:
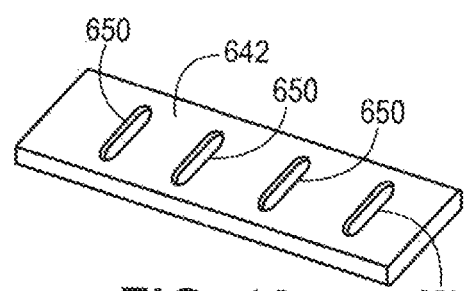
FIG. 12 is a perspective view of another alternative embodiment of a glare reducing portion for use with glasses according to the present invention.

Referring to FIGS. 11 and 12, while any glare reducing portion 142, 242, 342 can be a solid sheet, alternatively, glare reducers can have slots for venting. Exemplary glare reducer 542 has slots 550 that run parallel to the length of glare reducer 542, while glare reducer 642 has slots 650 that run perpendicular to the length of glare reducer 642. Slots 550, 650 can act as air vents to allow air to escape from under glare reducing portions 542, 642.

Figure 13:
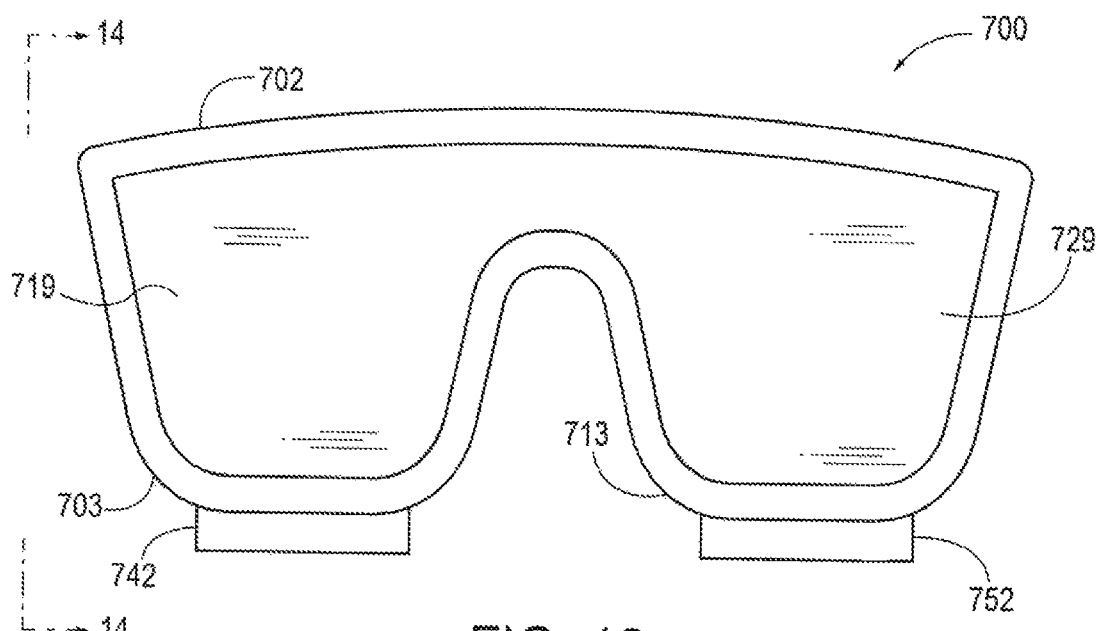
FIG. 13 is a front elevational view of glare reducing glasses according to another exemplary embodiment of the present invention.
Figure 14:
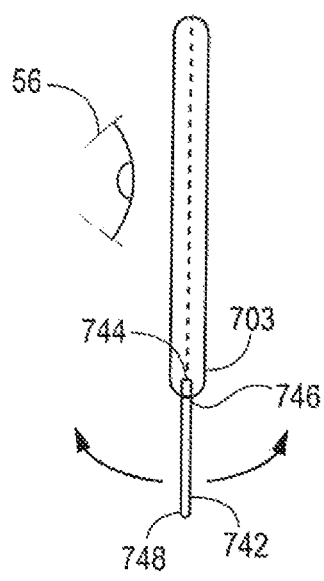
FIG. 14 is a side elevational view of the glasses of FIG. 13 taken along lines 14-14 of FIG. 13.

An alternative embodiment of glare reducing glasses 700 is shown in FIGS. 13-16. Glasses 700 includes a frame 702 with folding templar arms (not shown). Frame 702 extends around at least the bottom of a right lens 719 and a left lens 729. Right lens 719 and left lens 729 can be separate lens or, as shown in FIG. 13, right lens 719 and left lens 729 can be part of a single lens. Frame 702 includes a right connecting portion 703 located below right lens 719 and a left connecting portion 713 located below left lens 729.

Glare reducers 742, 752 are connected to and extend downwardly from frame 702 at connecting portions 703, 713, respectively. Glare reducers 742, 752 are mirror images of each other, so only glare reducer 742 will be discussed.

Figure 15:
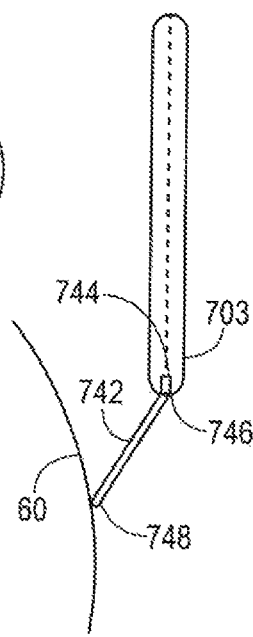
FIG. 15 is a side elevational view of the glasses of FIG. 13 being placed against a wearer's cheek.
Figure 16:
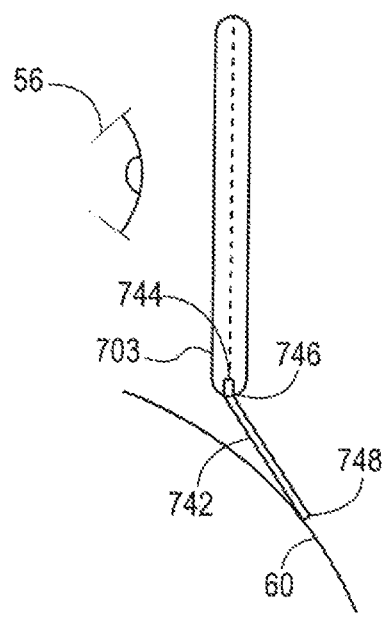
FIG. 16 is a side elevational view of the glasses of FIG. 13 placed on the wearer.

Glare reducer 742 is a generally opaque planar flap that is pivotally connected to frame 702 via a pivot pin 744 at a top end 746 of glare reducer mounted in connecting portion 703 of frame 702. See FIG. 14. Glare reducer 742 has a bottom end 748 that can engage the cheek 60 of a wearer as shown in FIG. 15. As the wearer places glasses 700 fully on his/her face, glare reducer 742 pivots about pivot pin 744 so that glare reducer 742 rests against the wearer's cheek 60, as shown in FIG. 16.

The relationship between glare reducer 742, pivot pin 744 and frame 702 is such that, absent an external force, friction among the components keeps glare reducer 742 in a fixed position relative to frame 702.

Figure 17:
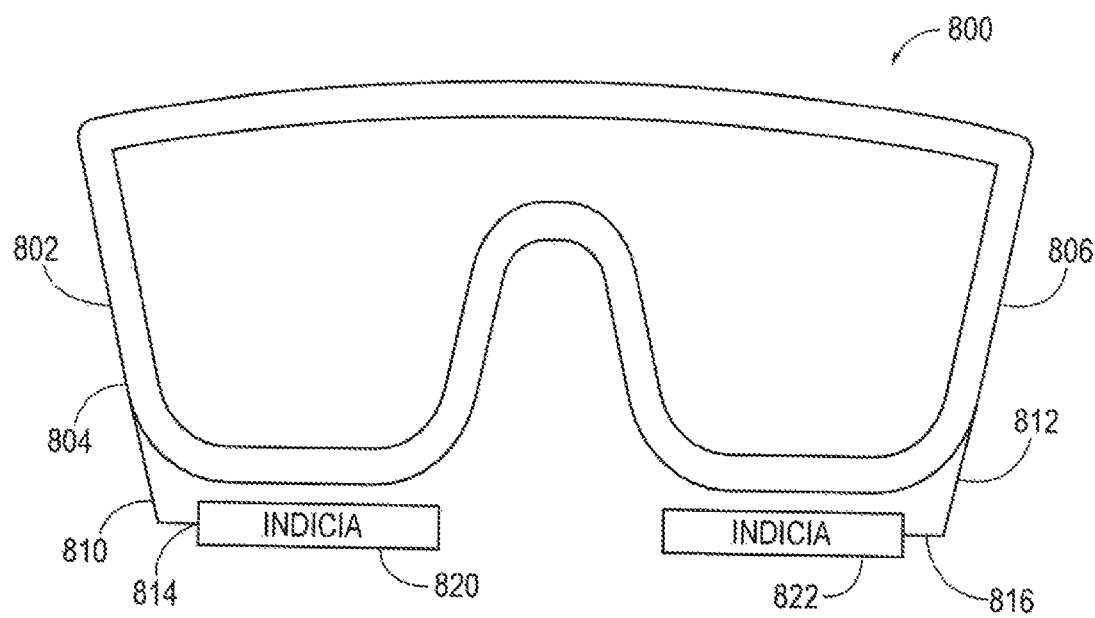
FIG. 17 is a front elevational view of glare reducing glasses according to another exemplary embodiment of the present invention.
Figure 18:
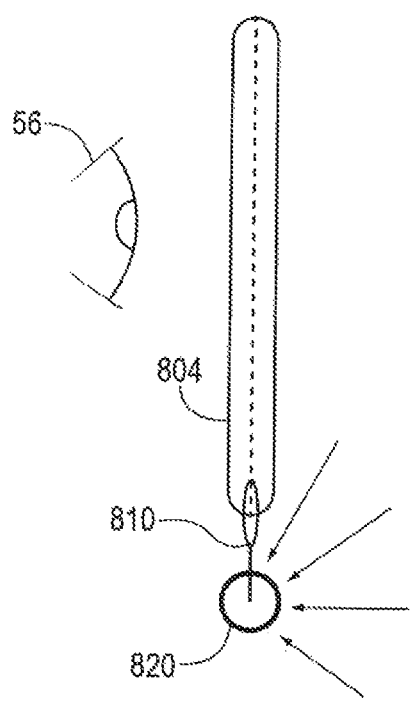
FIG. 18 is a side elevational view of the glasses of FIG. 17.
Figure 19:
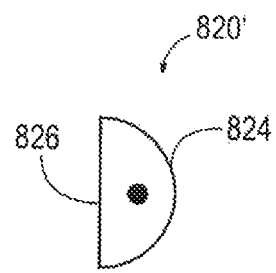
FIG. 19 is a side elevational view of an alternative embodiment of a roller for use with the glasses of FIGS. 17 and 8.

An alternative embodiment of glasses 800 according to the present invention is shown in FIGS. 17-19. Glasses 800 include a frame 802 with a right lens portion 804 and a left lens portion 806. A right stem 810 extends downwardly from right lens portion 804 and a corresponding left stem 812 extends downwardly from left lens portion 806.

Right stem 810 bends so that a free end portion 814 extends under right lens portion 804 and left stem 812 bends so that a free end portion 816 extends under left lens portion 806. A right roller 820 is rotatably mounted on free end portion 814 of right stem 810 and a left roller 822 is rotatably mounted on free end portion 816 of left stem portion 812.

Rollers 820, 822 have indicia applied to each and rollers 820, 822 can have a circular cross section, as roller 820 is shown in FIG. 18. Alternatively, rollers 820, 822 can have a polygonal cross section, such as triangular or rectangular. Still alternatively, rollers 820 can have a hybrid cross section, as shown in FIG. 19, with a first portion 824 being circular and a remaining portion 826 being planar. Different indicia can be printed on each face or around the perimeter of the rollers 820.

Figure 20:
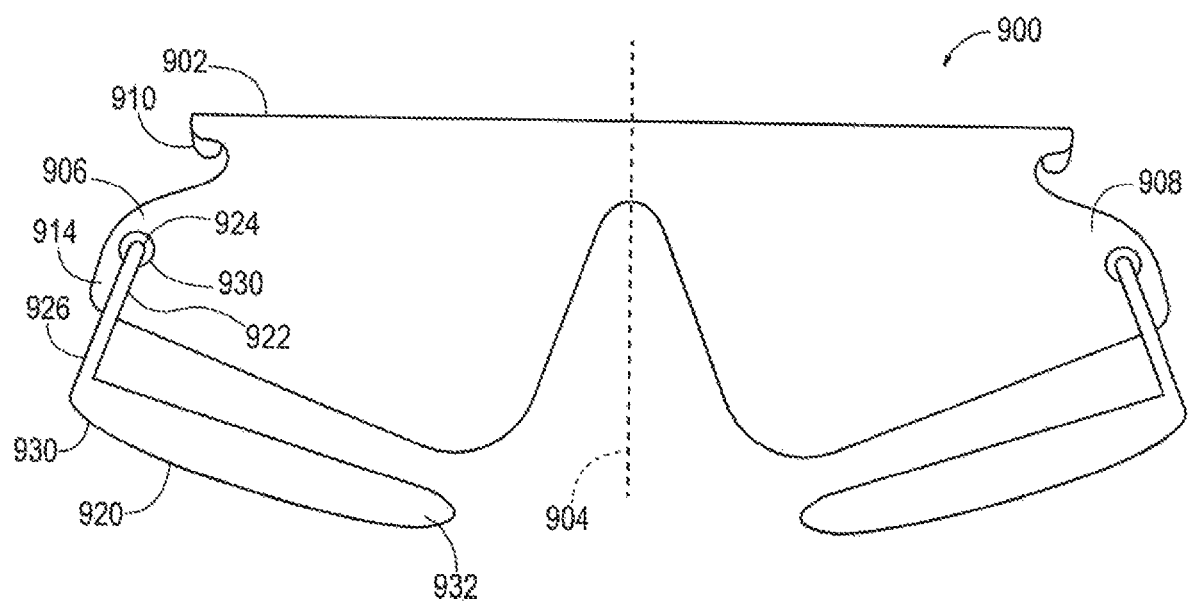
FIG. 20 is a front elevational view of glare reducing glasses according to another exemplary embodiment of the present invention.
Figure 21:
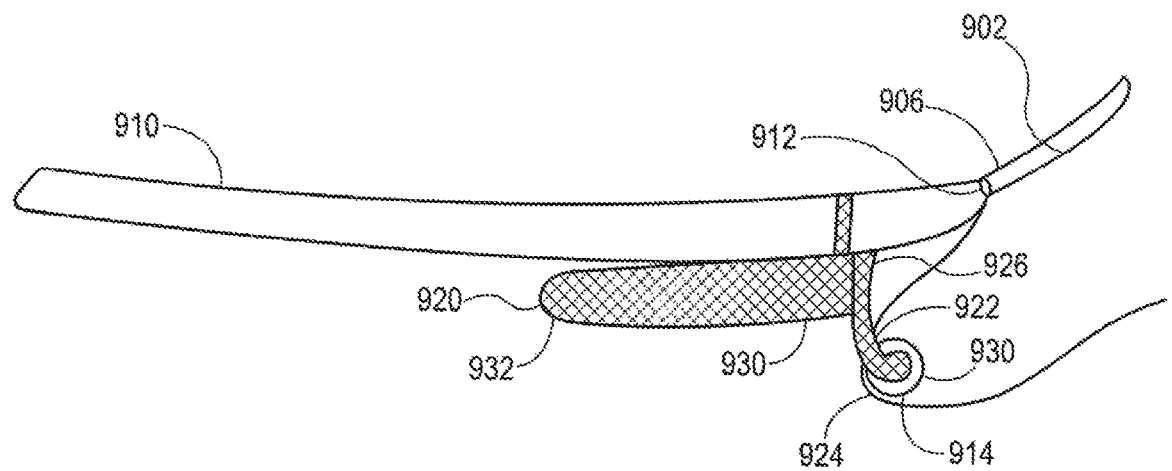
FIG. 21 is a side elevational view of the glasses of FIG. 20.

Another alternative embodiment of glasses 900 according to the present invention is shown in FIG. 20-21. Glasses 900 include a lens 902 that wraps at least partially around the side of a wearer's face. Although a single lens 902 is shown, those skilled in the art will recognize that glasses with multiple lenses (i.e., a right lens and a left lens) can be used.

Glasses 900 is a mirror image on either side of a central axis 904, so only right side 906 of glasses 900 will be discussed, with the same disclosure applicable to left side 908 of glasses 900.

A right templar arm 910 extends from lens 902. Right templar arm 910 can be pivotally attached to lens 902 at pivot 912. Alternatively, right templar arm 910 can be fixed to lens 902.

A light absorbing band 920 is pivotally attached to lens 902 at a free end 914 of lens 902. Optionally, indicia can be printed on band 920.

Band 920 can pivot between a forward position, as shown in FIG. 20, wherein band 920 is located below lens 902, and a stowed position, shown in FIG. 21, wherein band 920 is stowed away from lens 920 and under templar arm 910.

Band 920 includes an arm 922 that has a pivot end 924 connected to lens 902 and a free end 926. A grommet 930 can engage pivot end 924 to provide a frictional engagement between arm 922 and lens 902 so that band 920 can be fixed between the position of FIG. 20 and the position of FIG. 21.

Free end 926 of arm 922 is connected to a fixed end 930 of band 920. A free end 932 extends toward central axis 904 when band 920 is in the position of FIG. 20 and points toward a rear of templar arm 910 when band is in the position of FIG. 21.

It will be further understood that various changes in the details, materials, and arrangements of the parts which have been described and illustrated in order to explain the nature of this invention may be made by those skilled in the art without departing from the scope of the invention as expressed in the following claims.

I claim:

1. An eyeglass assembly comprising:
   a frame; and
   a lens assembly attached to the frame, the lens assembly comprising:
      a body;
      a connecting portion extending below the body; and
      a glare reducing portion extending below the connecting portion, wherein, when the eyeglass assembly is worn by a wearer, the glare reducing portion is located below a vision level of the wearer,
   wherein the body, the connection portion, and the glare reducing portion are a unibody construction and
   wherein the glare reducing portion comprises a cutout and wherein a filler is inserted into the cutout.

2. The eyeglass assembly according to claim 1, wherein the cutout is in a rear portion of the glare reducing portion.

3. The eyeglass assembly according to claim 1, wherein the cutout is in a forward portion of the glare reducing portion.

4. The eyeglass assembly according to claim 1, wherein the glare reducing portion is removable from the frame.

5. An eyeglass assembly comprising:
   a frame; and
   a lens assembly attached to the frame, the lens assembly comprises:
      a body;
      a connecting portion extending below the body; and
      a glare reducing portion extending below the connection portion, wherein, when the eyeglass assembly is worn by a wearer, the glare reducing portion is located below a vision level of the wearer, wherein the connecting portion comprises a cross bar.

6. The eyeglass assembly according to claim 5, wherein the cross bar is visible from a forward view of the eyeglass assembly.

7. The eyeglass assembly according to claim 5, wherein the cross bar is not visible from a forward view of the eyeglass assembly.

8. The eyeglass assembly according to claim 5, wherein the body comprises a side edge and wherein the connecting portion comprises a frame extending along the side edge.

9. The eyeglass assembly according to claim 5, wherein the glare reducing portion comprises at least one slot formed therein.

10. The eyeglass assembly according to claim 5, wherein the connecting portion is integral with the frame.

11. The eyeglass assembly according to claim 10, wherein the glare reducing portion is pivotally connected to the frame.

12. An eyeglass assembly comprising:
    a lens assembly including:
       a body;
       a connecting portion attached to the body; and
       a glare reducing portion extending below the connecting portion, wherein, when the eyeglass assembly is worn by a wearer, the glare reducing portion is located below a vision level of the wearer, wherein the glare reducing portion is pivotable between a first location below the lens assembly and a second location also below the lens.

13. The eyeglass assembly according to claim 12, wherein the glare reducing portion is movable relative to the body.

14. The eyeglass assembly according to claim 13, wherein the glare reducing portion is removable from the connecting portion.

15. The eyeglass assembly according to claim 12, wherein the body, the connecting portion, and the glare reducing portion are of unibody construction.

16. The eyeglass assembly according to claim 15, wherein the glare reducing portion further comprises a filler attached thereto.

17. An eyeglass assembly comprising:
    a lens assembly;
    a first templar arm attached to the lens assembly; and
    a glare reducing portion having a glare reducing band, the glare reducing band being pivotable between a first location below the lens assembly and a second location below the first templar arm.

18. The eyeglass assembly according to claim 17, wherein the glare reducing portion comprises and arm having a first end pivotally attached to the lens assembly and a second end fixedly attached to the band.

* * * * *